(12) United States Patent
Tetzner et al.

(10) Patent No.: US 12,712,708 B2
(45) Date of Patent: Aug. 18, 2026

(54) MOUSE DEVICE THAT DETECTS NON-HUMAN MOUSE EVENTS THROUGH ENCRYPTION AND METHOD THEREOF

(71) Applicant: Voyetra Turtle Beach, Inc., White Plains, NY (US)

(72) Inventors: Thaddaeus Erasmus Georg Richard Tetzner, Hamburg (DE); Chih Wei Hung, New Taipei City (TW); Min Chung Ke, New Taipei City (TW); Chih Kai Yang, New Taipei City (TW); Jhe Fu Liou, New Taipei City (TW)

(73) Assignee: Voyetra Turtle Beach, Inc., San Diego, CA (US)

( * ) Notice: Subject to any disclaimer, the term of this patent is extended or adjusted under 35 U.S.C. 154(b) by 52 days.

(21) Appl. No.: 18/725,370

(22) PCT Filed: Dec. 19, 2022

(86) PCT No.: PCT/US2022/081903
§ 371 (c)(1),
(2) Date: Jun. 28, 2024

(87) PCT Pub. No.: WO2023/129825
PCT Pub. Date: Jul. 6, 2023

(65) Prior Publication Data

US 2025/0080323 A1 Mar. 6, 2025

(30) Foreign Application Priority Data

Dec. 29, 2021 (TW) ................................ 110149332
Dec. 30, 2021 (CN) ......................... 202111644048.2

(51) Int. Cl.
*H04L 9/00* (2022.01)
*H04L 9/06* (2006.01)

(52) U.S. Cl.
CPC ................................. *H04L 9/0631* (2013.01)

(58) Field of Classification Search
CPC . H04L 9/0631; H04L 63/0428; H04L 63/067; A63F 13/75; G06F 2221/031;
(Continued)

(56) References Cited

U.S. PATENT DOCUMENTS 7,171,693 B2 1/2007 Tucker
11,052,311 B2 7/2021 Bleasdale-Shepherd
(Continued)

FOREIGN PATENT DOCUMENTS

EP 1637959 3/2006
KR 20090036813 4/2009
WO 2019232767 12/2019

OTHER PUBLICATIONS

Golle, Philippe, and Nicolas Ducheneaut. "Preventing bots from playing online games." Computers in Entertainment (CIE) 3.3 (2005): 3-3. (Year: 2005).*

(Continued)

*Primary Examiner* — Syed M Ahsan
(74) *Attorney, Agent, or Firm* — Sheppard Mullin Richter & Hampton LLP

(57) ABSTRACT

A mouse device includes a detection function to detect non-human mouse events through encryption and a detection method thereof. A mouse retrieves variable characters, executes an encryption process on a plaintext mouse event to obtain a ciphertext mouse event based on the variable characters and fixed characters. A computer device executes a decryption process on the ciphertext mouse event to obtain the plaintext mouse event when receiving the ciphertext mouse event, executes the plaintext mouse event, and executes an interfering process when the mouse event is different or cannot be decrypted.

10 Claims, 5 Drawing Sheets

(58) Field of Classification Search
CPC ...... G06F 3/038; G06F 3/0383; G06F 21/554; G06F 21/83; G06F 3/03543
See application file for complete search history.

(56) References Cited

U.S. PATENT DOCUMENTS 11,075,901 B1 * 7/2021 Alruhaily .............. G06F 21/316
2010/0195825 A1 8/2010 Cini
2015/0381621 A1 * 12/2015 Innes .................. H04W 12/069 726/7

OTHER PUBLICATIONS

Philippe Golle and Nicolas Ducheneaut. 2005. Preventing bots from playing online games. Comput. Entertain. 3, (Jul. 3, 2005), 3. https://doi.org/10.1145/1077246.1077255 (Year: 2005).*
Golle et al., "Preventing Bots from Playing Online Games", ACM Computers in Entertainment, vol. 3, No. 3, Article 3C, Jul. 2005 (Year: 2005), [retrieved on Mar. 3, 2023], retrieved from the Internet <URL: https://svn.sable.mcgill.ca/sable/courses/COMP763/newpapers/golle-05-preventing.pdf>, 10 pages.

* cited by examiner

MOUSE DEVICE THAT DETECTS NON-HUMAN MOUSE EVENTS THROUGH ENCRYPTION AND METHOD THEREOF

CROSS-REFERENCE TO RELATED APPLICATIONS

This application is a National Phase application under 35 U.S.C. § 371 of PCT Application No. PCT/US2022/081903, filed Dec. 19, 2022, which application claims the benefit of Taiwan Patent Application No. 110149332, filed Dec. 29, 2021, and Chinese Patent Application No. 202111644048.2, filed Dec. 30, 2021, which are hereby incorporated herein by reference in their entirety.

TECHNICAL FIELD

The present invention relates to a mouse device and a method thereof, and in particular, to a mouse device capable of detecting non-human mouse events through encryption and a method for detecting non-human mouse events through encryption.

BACKGROUND ART

Please refer to FIG. 1, which is a schematic diagram of generating non-human mouse events.

A method for cheating in a computer game is currently known. A video capture device 12 is used to capture an image signal (such as a game screen) of a computer device 10, and then the image signal is input into an analysis module 13 (such as a computer having a machine learning function or an automatic identification function).

Next, the analysis module 13 can analyze the image signal to find out a target position (for example, the position of a person or treasure on the game screen), and then automatically generate a corresponding non-human mouse event (such as a movement mouse event to move toward the target position) based on the target position, and send the non-human mouse event to an interface adapter 14.

In addition, a human-made mouse event is triggered when a user operates a mouse device 11.

One end of the interface adapter 14 is connected to the computer device 10, and the other end thereof is connected to the mouse device 11 and the analysis module 13.

The interface adapter 14 can send both the human-made mouse events (player actions) generated by human operations and the non-human mouse events (cheating actions) automatically generated by the analysis module 13 to the computer device 10.

The computer device 10 then directly executes all received mouse events (including human-made mouse events and non-human mouse events).

Compared with player actions, the cheating actions automatically generated by the analysis module 13 are usually faster and more accurate. This gives those players who use the above cheating method a great advantage in the game, resulting in an unfair game.

Therefore, the existing mouse event processing has the above problems, and more effective solutions are urgently needed.

SUMMARY OF THE INVENTION

The main purpose of the present invention is to provide a mouse device capable of detecting non-human mouse events through encryption and a method for detecting non-human mouse events through encryption.

In one embodiment, a mouse device capable of detecting a non-human mouse event through encryption comprises a mouse device and a driver. The mouse device is used for electrically connecting a computer device and comprises an encryption chip. The encryption chip is for obtaining a variable character, and executing an encryption process on a plaintext mouse event based on the variable character and a fixed character to obtain a ciphertext mouse event. The driver is installed on the computer device, and used for, when the driver is executed and then the ciphertext mouse event is received, executing a decryption process on the ciphertext mouse event based on the fixed character to obtain the plaintext mouse event, and then executing the plaintext mouse event, and when receiving another plaintext mouse event or another ciphertext mouse event that cannot be decrypted, executing an interference process. The encryption chip executes the encryption process to obtain an encryption key based on the variable character and the fixed character, and encrypts the plaintext mouse event based on the encryption key to obtain the ciphertext mouse event, and the variable character is recorded in the ciphertext mouse event. The driver executes the decryption process to obtain the variable character from the ciphertext mouse event, obtains the encryption key based on the variable character and the fixed character, and decrypts the ciphertext mouse event based on the encryption key to obtain the plaintext mouse event.

In one embodiment, the mouse device is used for obtaining a current state as the variable character, and selecting at least one of a plurality of words in a dictionary as the variable character, or executing a random character process to obtain a random character as the variable character. The current state comprises at least one of a current time and a current count.

In one embodiment, the mouse device is used for sending a fixed character request to the driver. The driver is configured to obtain the fixed character and return the fixed character to the mouse device.

In one embodiment, the mouse device is used for executing an AES encryption and a BASE64 process on the plaintext mouse event, and recording the variable character in the ciphertext mouse event in a form of plaintext.

In one embodiment, the driver is configured to execute at least one of the following: changing the mouse coordinates of a suspicious event to cause an operating system of the computer device to move a mouse pointer to changed mouse coordinates; filtering out a suspicious event so that an operating system does not execute the suspicious event; filtering out a click mouse event received after the suspicious event so that an operating system does not execute the click mouse event after the suspicious event; and displaying a non-human operation prompt. The suspicious event comprises said another plaintext mouse event or said another ciphertext mouse event that cannot be decrypted.

In one embodiment, a method for detecting a non-human mouse event through encryption comprises: step a: obtaining a variable character by a mouse device; step b: executing an encryption process on a plaintext mouse event based on the variable character and a fixed character to obtain a ciphertext mouse event; step c: executing, when a computer device receives the ciphertext mouse event, a decryption process on the ciphertext mouse event based on the fixed character to obtain the plaintext mouse event, and executing the plaintext mouse event; and step d: executing, when receiving another plaintext mouse event or another ciphertext mouse event that cannot be decrypted, an interference process. The encryption process comprises: step e1: obtaining an encryption key based on the variable character and the fixed character; and step e2: encrypting the plaintext mouse event based on the encryption key to obtain the ciphertext mouse event, wherein the variable character is recorded in the ciphertext mouse event. The decryption process comprises: step f1: obtaining the variable character from the ciphertext mouse event; step f2: obtaining the encryption key based on the variable character and the fixed character; and step f3: decrypting the ciphertext mouse event based on the encryption key to obtain the plaintext mouse event.

In one embodiment, the step a comprises: obtaining a current state as the variable character, selecting at least one of a plurality of words in a dictionary as the variable character, or executing a random character process to obtain a random character and using the random character as the variable character; wherein the current state comprises at least one of a current time and a current count.

In one embodiment, prior to the step b, the method further comprises: step g1: sending a fixed character request by the mouse device to a driver of the computer device; step g2: obtaining the fixed character through the driver on the computer device; and step g3: returning the fixed character to the mouse device.

In one embodiment, the step e2 comprises executing an AES encryption and a BASE64 process on the plaintext mouse event, and recording the variable character in the ciphertext mouse event in a form of plaintext.

In one embodiment, the interference process comprises at least one of the following: step c1: changing the mouse coordinates of the plurality of suspicious events to cause an operating system of the computer device to move a mouse pointer to the changed mouse coordinates; step c2: filtering out the plurality of suspicious events so that the operating system does not execute the plurality of suspicious events; step c3: filtering out a click mouse event received after the plurality of suspicious events so that the operating system does not execute the click mouse event after the plurality of suspicious events; and step c4: displaying a non-human operation prompt, wherein the suspicious event comprises said another plaintext mouse event or said another ciphertext mouse event that cannot be decrypted.

The present invention is able to effectively detect non-human movement mouse events, and execute interference on the non-human movement mouse events to deter non-human operations.

11: Mouse device; 10: Computer device; 12: Video capture device; 13: Analysis module; 14: Interface adapter; 20: Mouse device; 21: Driver; 22: encryption chip; 3: Computer device; 30: Processor; 300: Application; 301: Operating system; 31: Storage device; 32: Display; 33: Communication interface; 40: Decryption module; 41: Interference module; S10-S15: Detection and interference steps; S20-S21: Encryption steps; S30-S32: Decryption steps; S40-S41: Fixed character acquisition steps; S50-S53: Interference steps

DESCRIPTION OF THE EMBODIMENTS

The present invention will be further described below in conjunction with the accompanying drawings and specific embodiments, so that a person skilled in the art can better understand the present invention and implement the present invention. However, the embodiments provided herein are not intended to limit the present invention.

Figure 1:
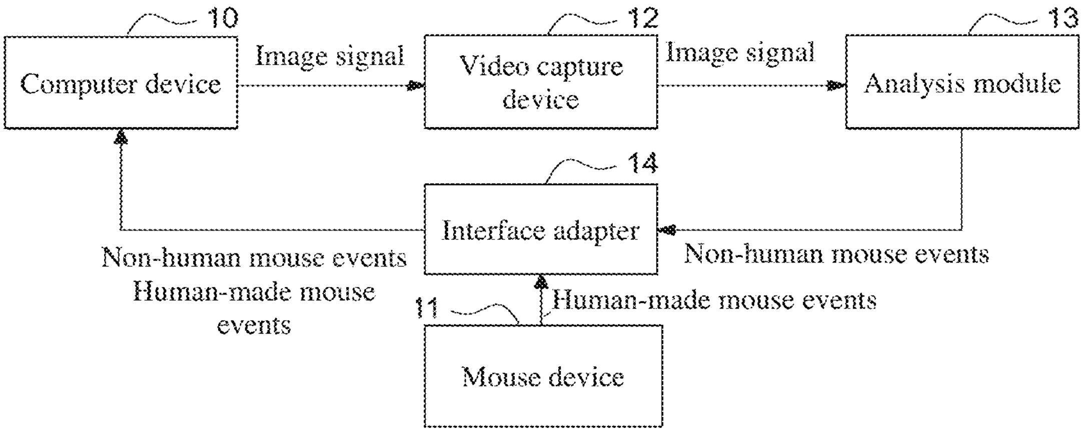
FIG. 1 is a schematic diagram of generating a non-human mouse event.
Figure 2:
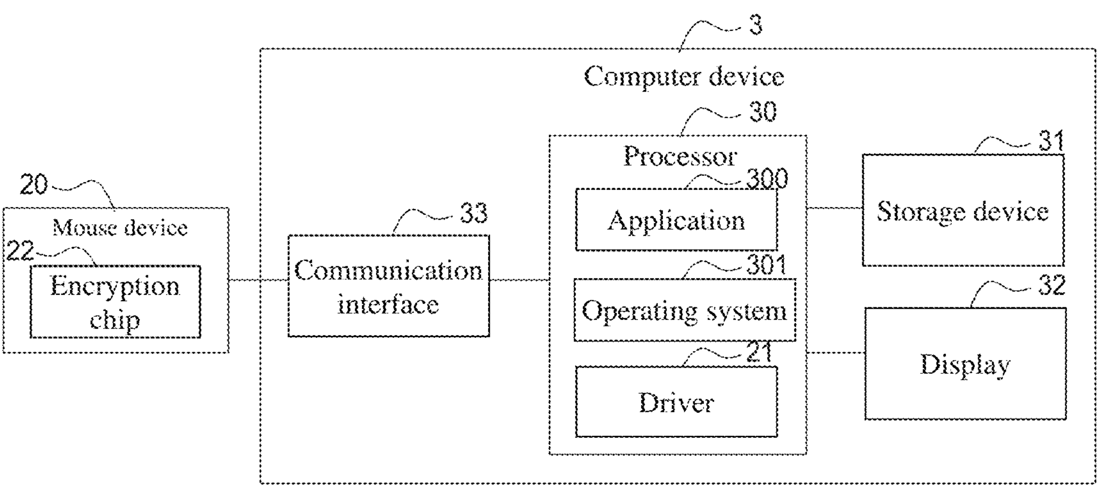
FIG. 2 is a structural diagram of a mouse device according to an embodiment of the present invention.

Please refer to FIG. 2, which is a structural diagram of a mouse device according to an embodiment of the present invention.

The present invention provides a mouse device with the function of detecting non-human mouse events through encryption, which includes a mouse device 20 and a driver 21.

The mouse device 20 can be electrically connected to a communication interface 33 (for example, a Bluetooth interface or a USB interface) of a computer device 3. When the mouse device 20 is moved or clicked by a user, a corresponding movement mouse event or click mouse event is triggered.

In the present invention, the mouse device 20 includes an encryption chip 22. The encryption chip 22 can execute an encryption algorithm to encrypt a plaintext mouse event (that is, a movement mouse event and/or a click mouse event) into a ciphertext mouse event.

In one embodiment, the encryption chip 22 is a programmable controller or a programmable circuit independent of a mouse controller. After the encryption chip 22 is enabled, it can encrypt a mouse event generated by the mouse controller according to a preset encryption algorithm or encryption circuit.

The mouse device 20 can transmit the encryption mouse event to the computer device 3.

The computer device 3 has a storage device 31, a display 32, the communication interface 33, and a processor 30 electrically connected to the above-mentioned devices.

The driver 21 is installed in the computer device 3 and can be executed by the processor 30 to implement the detection method of the present invention.

The processor 30 can execute the driver 21 to identify the movement mouse event or the click mouse event, and decrypt the ciphertext mouse event into a plaintext mouse event. In addition, it can execute the obtained plaintext mouse event through an operating system 301 to affect an application 300 (for example, a main game program).

Figure 3:
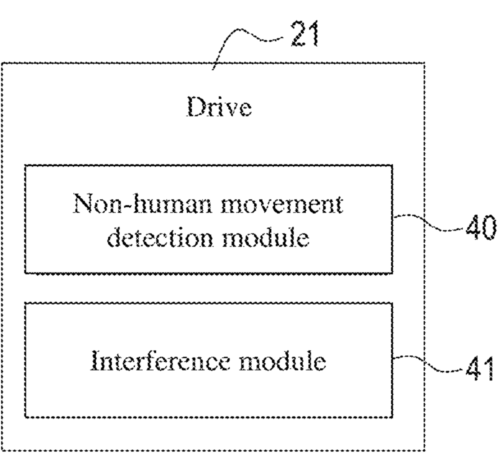
FIG. 3 is a structural diagram of a driver according to an embodiment of the present invention.

Please refer to FIG. 2 and FIG. 3. FIG. 3 is a structural diagram of a driver according to an embodiment of the present invention.

In one embodiment, the driver 21 includes a decryption module 40 and an interference module 41.

The decryption module 40 is used to decrypt a ciphertext mouse event.

The interference module 41 is used for interfering when a non-human mouse event is detected.

The aforementioned modules are connected to each other, which may be electrical connection or information connection, and may be firmware software modules. The storage device 31 may include a non-transitory computer-readable recording medium. The aforementioned non-transitory computer-readable recording medium stores the driver 21. The driver 21 stores a program code executable by the computer. After the processor 30 executes the aforementioned program code, the functions of the aforementioned modules can be implemented.

Figure 4:
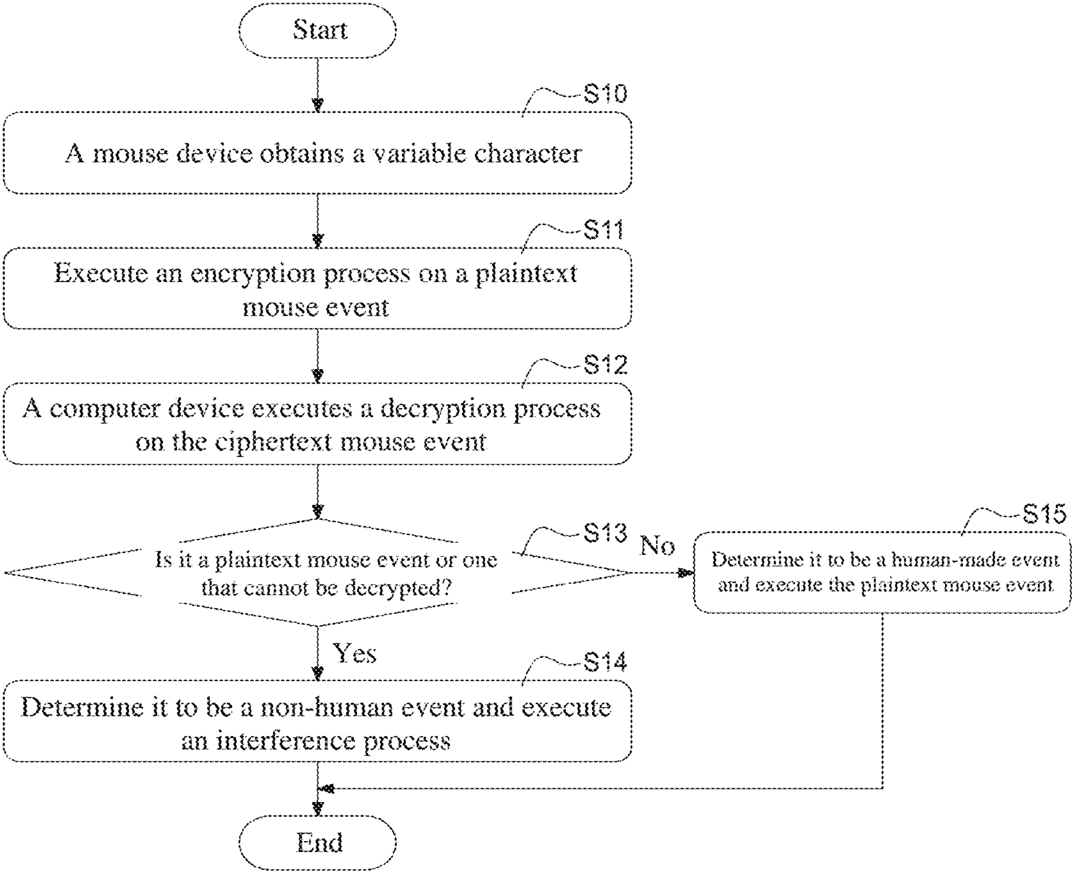
FIG. 4 is a flowchart of a detection method according to an embodiment of the present invention.

Please refer to FIG. 2 to FIG. 4. FIG. 4 is a flowchart of a detection method according to an embodiment of the present invention. The detection method of this embodiment includes the following steps.

In step S10, the encryption chip 22 of the mouse device 20 obtains a variable character.

In one embodiment, the mouse device 20 and the driver 21 can be configured to switch between an encryption mode (that is, the detection method of the present invention) and a non-encryption mode.

In the encryption mode, the mouse device 20 executes the encryption on all or a specified mouse event to generate a ciphertext mouse event. The driver 21 only executes a decryptable ciphertext mouse event, and does not execute (or executes but with interference) a plaintext mouse event and a ciphertext mouse event that cannot be decrypted. In other words, in the encryption mode, the present invention can detect the cheating behavior of a non-human mouse event.

In the non-encryption mode, the mouse device 20 does not execute an encryption mouse event for encryption, but directly sends the plaintext mouse event. The driver 21 executes all plaintext mouse events. In other words, in the non-encryption mode, the present invention cannot detect the cheating behavior of a non-human mouse event.

In one embodiment, the encryption chip 22 can obtain a current state of the mouse device 20 as the variable character, select at least one of a plurality of words in a pre-established dictionary as the variable character, or execute a random character process to obtain a random character as the variable character.

In one embodiment, the current state includes the current time, such as the number of seconds in the current time.

In one embodiment, the current state includes the current count, such as 1 for the first mouse event, 2 for the second mouse event, and so on.

In step S11, the encryption chip 22 of the mouse device 20 executes an encryption process on a plaintext mouse event based on the variable character and a fixed character to obtain a ciphertext mouse event.

It is worth mentioning that the ciphertext mouse event following the encryption process cannot be decoded by an unsupported (that is, without a corresponding key and decryption algorithm) driver 21. That is, the mouse device 20 and the driver 21 are arranged in pairs.

In step S12, the computer device obtains the fixed character through the decryption module 40 of the driver 21 when receiving the ciphertext mouse event, and executes a decryption process on the ciphertext mouse event based on the fixed character so as to obtain a restored plaintext mouse event.

In one embodiment, the foregoing encryption and decryption processes may be symmetric encryption and decryption or asymmetric encryption and decryption. This feature is not limited herein.

In step S13, the computer device determines through the decryption module 40 of the driver 21 whether the received mouse event is another plaintext mouse event or another ciphertext mouse event that cannot be decrypted in step S12.

If decryption can be executed successfully, step S15 is executed.

If it is another plaintext mouse event or another ciphertext mouse event that cannot be decrypted, execute step S14 is executed.

In step S14, the computer device determines through the driver 21 that the received mouse event (such as a plaintext mouse event or a ciphertext mouse event that cannot be decrypted) is a non-human mouse event, and executes an interference process through the interference module 41.

In step S15, the computer device determines, through the driver 21, that the received decryptable ciphertext mouse event is a human-made event, and executes the plaintext mouse event obtained from the decryption.

The present invention can effectively detect non-human movement mouse events, and then execute interference on the non-human movement mouse events to deter non-human operations.

Figure 5:
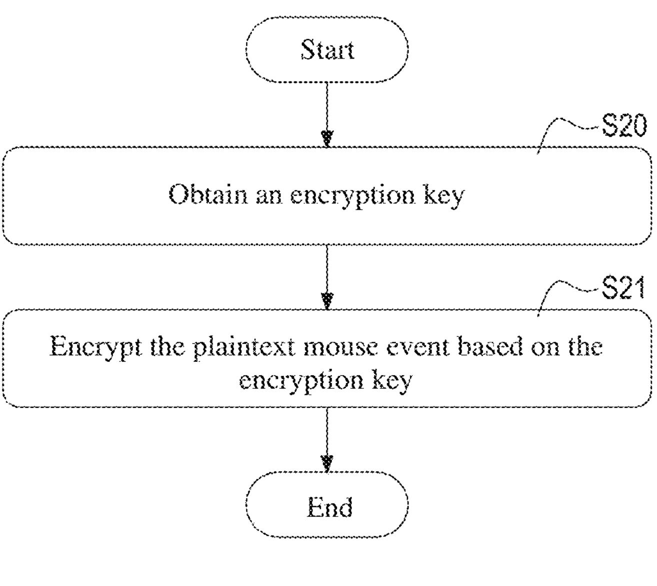
FIG. 5 is a partial flowchart of a detection method according to an embodiment of the present invention.

Please refer to FIG. 2 to FIG. 5. FIG. 5 is a partial flowchart of a detection method according to an embodiment of the present invention. In the detection method of this embodiment, the encryption process includes steps S20 to S21.

In step S20, the encryption chip 22 obtains an encryption key based on the variable character and the fixed character.

In one embodiment, the encryption chip 22 connects the variable character and the fixed character to form an encryption key. For example, the variable character and fixed character are viewed as strings, and a string merging process is executed.

In step S21, the encryption chip 22 encrypts the plaintext mouse event based on the encryption key to obtain the ciphertext mouse event, and records the variable character in the ciphertext mouse event.

In one embodiment, the encryption process may include AES, ChaCha20, 3DES, Salsa20, DES, Blowfish, IDEA, RC5, RC6, Camellia, or other symmetric encryption processes.

In one embodiment, the encryption chip 22 executes the Advanced Encryption Standard (AES) for encryption and the BASE64 process on the plaintext mouse event to encode binary sequence data into a text composed of an ASCII character sequence.

In one embodiment, the encryption chip 22 records the variable character in the ciphertext mouse event in a form of plaintext.

Figure 6:
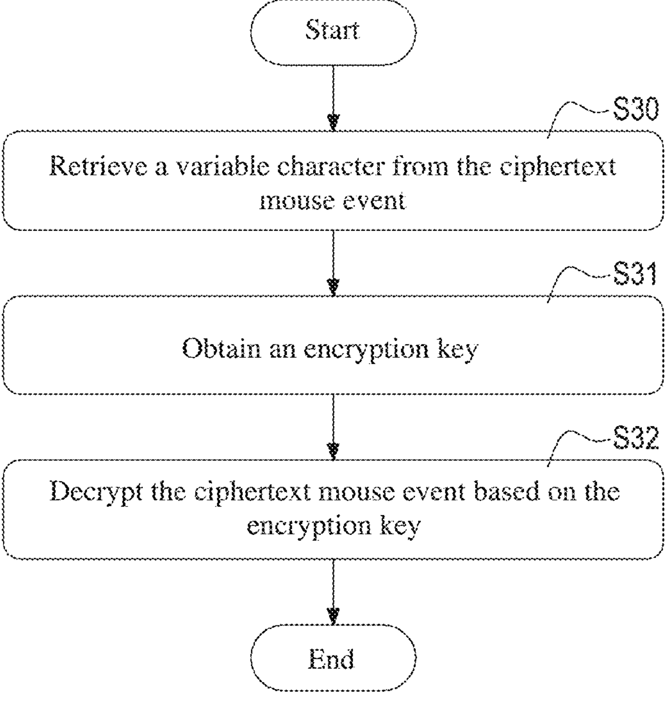
FIG. 6 is a partial flowchart of a detection method according to an embodiment of the present invention.

Please refer to FIG. 2 to FIG. 6. FIG. 6 is a partial flowchart of a detection method according to an embodiment of the present invention. In the detection method of this embodiment, the decryption process includes steps S30 to S32.

In step S30, the processor 30 retrieves the variable character from the ciphertext mouse event through the decryption module 40 of the driver 21.

In one embodiment, the variable character is placed at a fixed position of the ciphertext mouse event, such as a first character group, a last character group, etc.

In step S31, the processor 30 obtains the encryption key based on the variable character and the fixed character through the decryption module 40 of the driver 21.

In one embodiment, the decryption module 40 obtains the encryption key by connecting the retrieved variable character with the known fixed character.

In step S32, the processor 30 decrypts the ciphertext mouse event through the decryption module 40 of the driver 21 based on the encryption key to obtain the plaintext mouse event.

In one embodiment, the decryption module 40 executes the Advanced Encryption Standard (AES) decryption and the BASE64 process on the ciphertext mouse event to obtain the plaintext mouse event.

Figure 7:
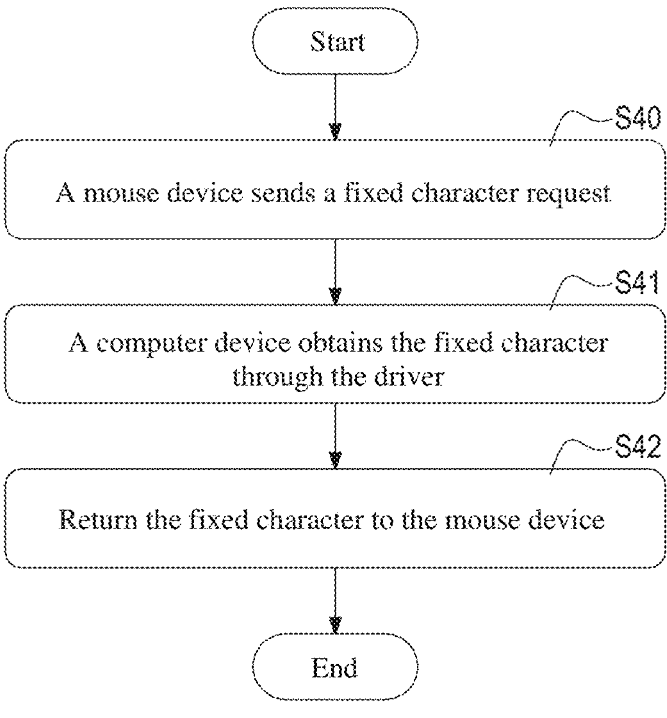
FIG. 7 is a partial flowchart of a detection method according to an embodiment of the present invention.

Please refer to FIG. 2 to FIG. 7. FIG. 7 is a partial flowchart of a detection method according to an embodiment of the present invention. In the detection method of this embodiment, steps S40 to S42 for synchronizing the fixed character are further included.

In step S40, the encryption chip 22 of the mouse device 20 sends a fixed character request to the driver 21 of the computer device 3.

In step S41, the computer device 3 obtains the fixed character through the driver 21, and stores a copy of the fixed character.

In one embodiment, the fixed character can be set by a user or automatically generated by the driver 21. This feature is not limited herein.

In step S42, the driver 21 controls the computer device 3 to return the fixed character to the encryption chip 22 of the mouse device 20.

In this way, the encryption chip 22 and the driver 21 can have the same fixed character.

Figure 8:
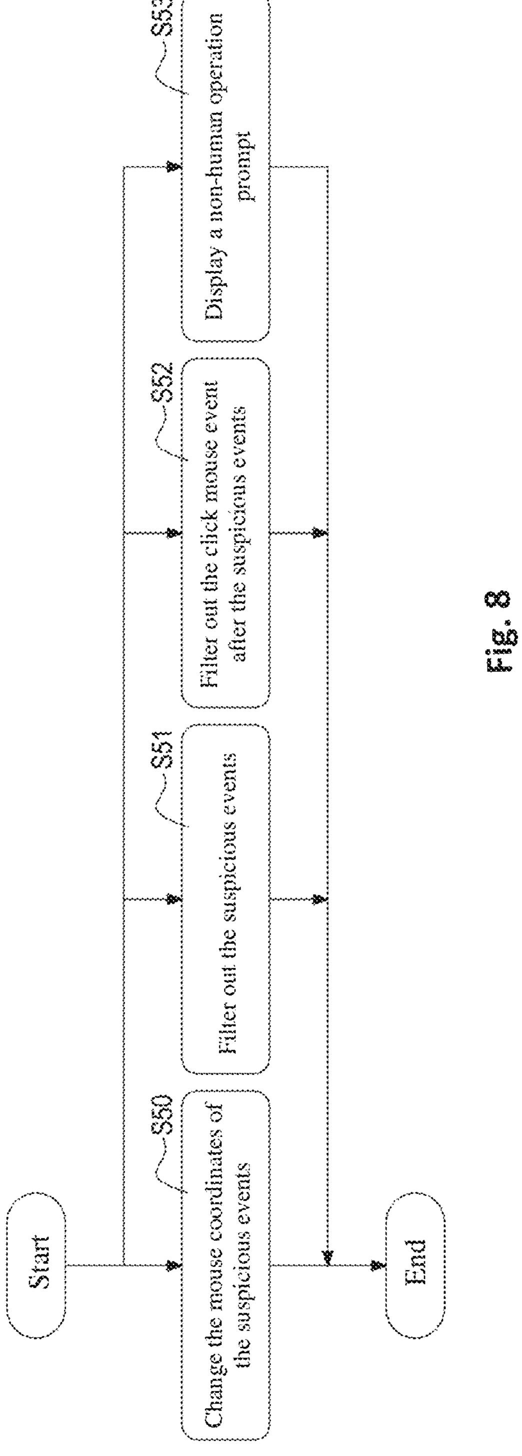
FIG. 8 is a partial flowchart of a detection method according to an embodiment of the present invention.

Please refer to FIG. 2 to FIG. 8. FIG. 8 is a partial flowchart of a detection method according to an embodiment of the present invention. Compared with the detection method of FIG. 4, the detection method in this embodiment further includes at least one of steps S60 to S63 for implementing interference for a suspicious event.

The suspicious event herein can be, for example, another plaintext mouse event or another ciphertext mouse event that cannot be decrypted as mentioned above.

In step S50, the processor 30 changes the mouse coordinates of the suspicious events through the interference module 41 of the driver 21, so that the operating system 301 moves the mouse pointer to reach the changed mouse coordinates, that is, causes the mouse pointer to offset. The aforementioned offset can be a preset fixed value or a randomly generated value.

In step S51, the processor 30 filters out the suspicious events through the interference module 41 of the driver 21, so that the operating system 301 does not execute the suspicious events, that is, ignores the non-human mouse events.

In step S52, the processor 30 filters out the click mouse event received after the suspicious events through the interference module 41 of the driver 21, so that the operating system 301 does not execute the click mouse event after the suspicious event. That is, the cheating user cannot execute subsequent operations (such as shooting operations, pickup operations, etc.) after moving to a target location.

In step S53, the processor 30 displays a non-human operation prompt on the display 32 through the interference module 41 of the driver 21, for example, popping out a prompt window to interrupt the operation of the cheating user.

In this way, the present invention can effectively interfere with cheating users to improve the fairness of the game.

The above-mentioned embodiments are only some preferred embodiments for fully illustrating the present invention. The scope of protection of the present invention is not limited to them. Equivalent substitutions or modifications can be made by a person skilled in the art on the basis of the present invention. All of these changes are within the scope of protection of the present invention. The scope of protection of the present invention is defined by the claims.

The invention claimed is:

1. A mouse, comprising:

a mouse device, configured to electrically connect to a computer device, the mouse device comprising:

an encryption circuit configured to obtain a variable character, and execute an encryption process on a plaintext mouse event based on the variable character and a fixed character to obtain a ciphertext mouse event; and a driver for installation on the computer device, comprising instructions that when executed perform a decryption process on the ciphertext mouse event based on the fixed character to obtain the plaintext mouse event and executes the obtained plaintext mouse event, and upon receiving another plaintext mouse event or another ciphertext mouse event that cannot be decrypted, executes an interference process;

wherein the encryption process, upon execution, obtains an encryption key based on a determination that the variable character and the fixed character indicate a human-made mouse event, and encrypts the plaintext mouse event based on the encryption key to obtain the ciphertext mouse event, and records the variable character in the ciphertext mouse event;

wherein the decryption process, upon execution, obtains the variable character from the ciphertext mouse event, obtains the encryption key based on the variable character and the fixed character, and decrypts the ciphertext mouse event based on the encryption key to obtain the plaintext mouse event.

2. The mouse of claim 1, wherein the mouse device is configured to obtain a current state as the variable character, and select at least one of a plurality of words in a dictionary as the variable character, or execute a random character process to obtain a random character as the variable character;

wherein the current state comprises at least one of a current time and a current count.

3. The mouse of claim 1, wherein the mouse device is configured to sending a fixed character request to the driver;

wherein the driver is configured to obtain the fixed character and return the fixed character to the mouse device.

4. The mouse of claim 1, wherein the mouse device is configured to execute an AES encryption and a BASE64 process on the plaintext mouse event, and record the variable character in the ciphertext mouse event in plaintext form.

5. The mouse of claim 1, wherein the instructions are configured to execute at least one of the following:

changing the mouse coordinates of a suspicious event to cause an operating system of the computer device to move a mouse pointer to changed mouse coordinates;

filtering out a suspicious event so that an operating system does not execute the suspicious event;

filtering out a click mouse event received after the suspicious event so that an operating system does not execute the click mouse event after the suspicious event; or displaying a non-human operation prompt;

wherein the suspicious event comprises said another plaintext mouse event or said another ciphertext mouse event that cannot be decrypted.

6. A method for detecting a non-human mouse event through encryption, wherein the method comprises:

executing an encryption process on a plaintext mouse event based on a determination that a variable character received by a mouse device and a fixed character indicate a human-made mouse event to obtain a ciphertext mouse event;

executing a decryption process on the ciphertext mouse event based on the fixed character to obtain the plaintext mouse event, and executing the plaintext mouse event; and executing, upon receiving another plaintext mouse event or another ciphertext mouse event that cannot be decrypted, an interference process;

wherein the encryption process comprises:

obtaining an encryption key based on the variable character and the fixed character; and encrypting the plaintext mouse event based on the encryption key to obtain the ciphertext mouse event, wherein the variable character is recorded in the ciphertext mouse event;

wherein the decryption process comprises:

obtaining the variable character from the ciphertext mouse event;

obtaining the encryption key based on the variable character and the fixed character; and decrypting the ciphertext mouse event based on the encryption key to obtain the plaintext mouse event.

7. The method for detecting a non-human mouse event according to claim 6, further comprising obtaining a current state as the variable character, selecting at least one of a plurality of words in a dictionary as the variable character, or executing a random character process to obtain a random character and using the random character as the variable character;

wherein the current state comprises at least one of a current time and a current count.

8. The method for detecting a non-human mouse event according to claim 6, further comprising, prior to executing the encryption process:

receiving a fixed character request from the mouse device at a driver of a computer device;

obtaining the fixed character through the driver on the computer device; and sending the fixed character to the mouse device.

9. The method for detecting a non-human mouse event according to claim 6, wherein encrypting the plaintext mouse event comprises executing an AES encryption and a BASE64 process on the plaintext mouse event, and recording the variable character in the ciphertext mouse event in plaintext form.

10. The method for detecting a non-human mouse event according to claim 6, wherein the interference process comprises at least one of the following:

changing mouse coordinates of a plurality of suspicious events to cause an operating system of a computer device to move a mouse pointer to the changed mouse coordinates;

filtering out the plurality of suspicious events so that the operating system does not execute the plurality of suspicious events;

filtering out a click mouse event received after the plurality of suspicious events so that the operating system does not execute the click mouse event after the plurality of suspicious event; or displaying a non-human operation prompt, wherein the suspicious event comprises said another plaintext mouse event or said another ciphertext mouse event that cannot be decrypted.

* * * * *